United States Patent [19]

Harshman

[11] Patent Number: 5,787,638
[45] Date of Patent: Aug. 4, 1998

[54] BOUQUET HOLDER APPARATUS

[75] Inventor: Trent A. Harshman, Galveston, Ind.

[73] Assignee: Syndicate Sales, Inc., Kokomo, Ind.

[21] Appl. No.: 941,568

[22] Filed: Sep. 30, 1997

Related U.S. Application Data

[63] Continuation of Ser. No. 677,064, Jul. 8, 1996.

[51] Int. Cl.⁶ ........................................................ A01G 5/00
[52] U.S. Cl. .......................... 47/41.12; 47/41.01; 248/27.8
[58] Field of Search .................................. 47/41.12, 41.01, 47/41.14; 248/27.8

[56] References Cited

U.S. PATENT DOCUMENTS

| | | |
|---|---|---|
| 65,204 | 5/1867 | Frye, Jr. . |
| D. 317,884 | 7/1991 | Spicer . |
| 1,225,767 | 5/1917 | Casteris . |
| 1,448,919 | 3/1923 | Duffy . |
| 1,851,205 | 3/1932 | Nagai . |
| 2,486,109 | 10/1949 | Brutocao et al. . |
| 2,728,964 | 1/1956 | Baird . |
| 2,765,585 | 10/1956 | Smithers . |
| 2,844,916 | 7/1958 | Rapp . |
| 3,651,601 | 3/1972 | La Montagne . |
| 3,949,568 | 4/1976 | Gallagher . |
| 4,204,365 | 5/1980 | Hirvi . |
| 4,418,496 | 12/1983 | Koistinen . |
| 4,566,221 | 1/1986 | Kossin . |
| 5,070,644 | 12/1991 | Hasty . |
| 5,414,957 | 5/1995 | Kenney . |
| 5,454,189 | 10/1995 | Graham et al. . |

FOREIGN PATENT DOCUMENTS

| | | |
|---|---|---|
| 653445 | 11/1937 | Germany . |
| 1151128 | 5/1969 | United Kingdom . |

OTHER PUBLICATIONS

"Bouquet Holders and Designer Trays and Bouquet Stands" Lomey Manufacturing Inc. Brochure 1987.

*Primary Examiner*—Tamara L. Graysay
*Assistant Examiner*—Thomas A. Beach
*Attorney, Agent, or Firm*—Barnes & Thornburg

[57] ABSTRACT

A bouquet design/display system includes a bouquet holder apparatus including a head configured to support flowers thereon and a handle extending downwardly from the head. The handle is formed to include an outer flange and a convex body portion which is curved to extend downwardly beyond a plane of the flange to facilitate gripping of the handle by a user. The bouquet design/delivery/display system also includes a stand for supporting the bouquet holder. The stand includes a base and a head portion located above the base. The head portion including a front wall and a rear wall. The front and rear walls of the head portion each are formed to include a slot therein for receiving the handle of the bouquet holder so that the handle extends between the front and rear walls of the head portion to support the bouquet holder in a horizontal orientation. The stand further includes a top surface extending transverse to the front and rear walls of the head portion. The top surface is formed to include a slot therein for receiving the handle of the bouquet holder to support the bouquet holder in a vertical orientation.

18 Claims, 2 Drawing Sheets

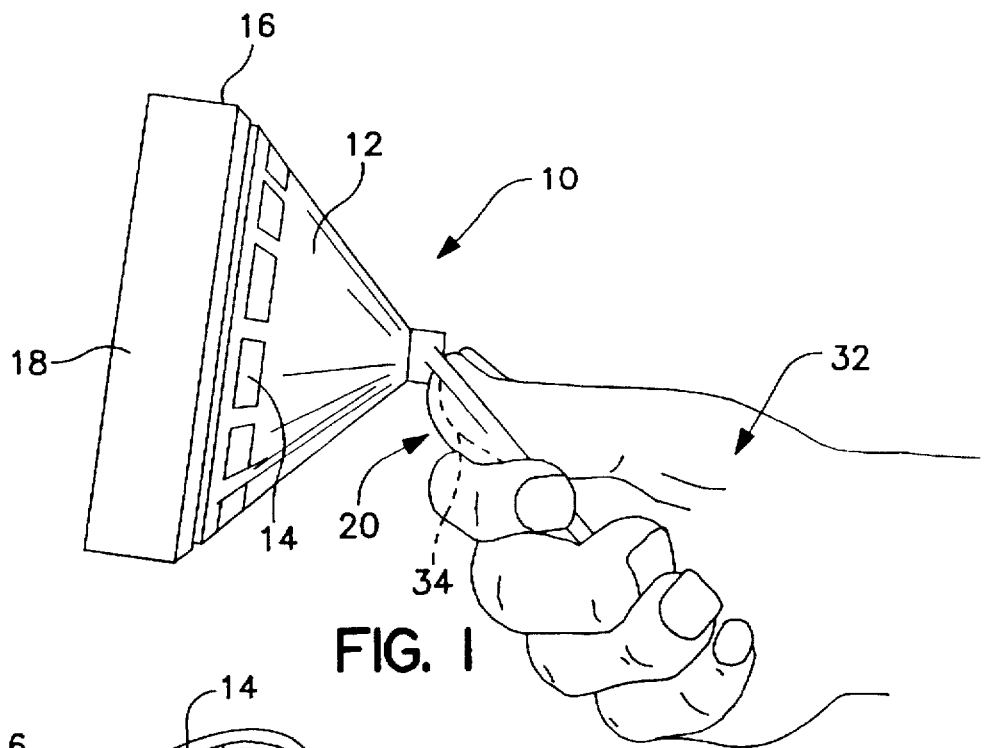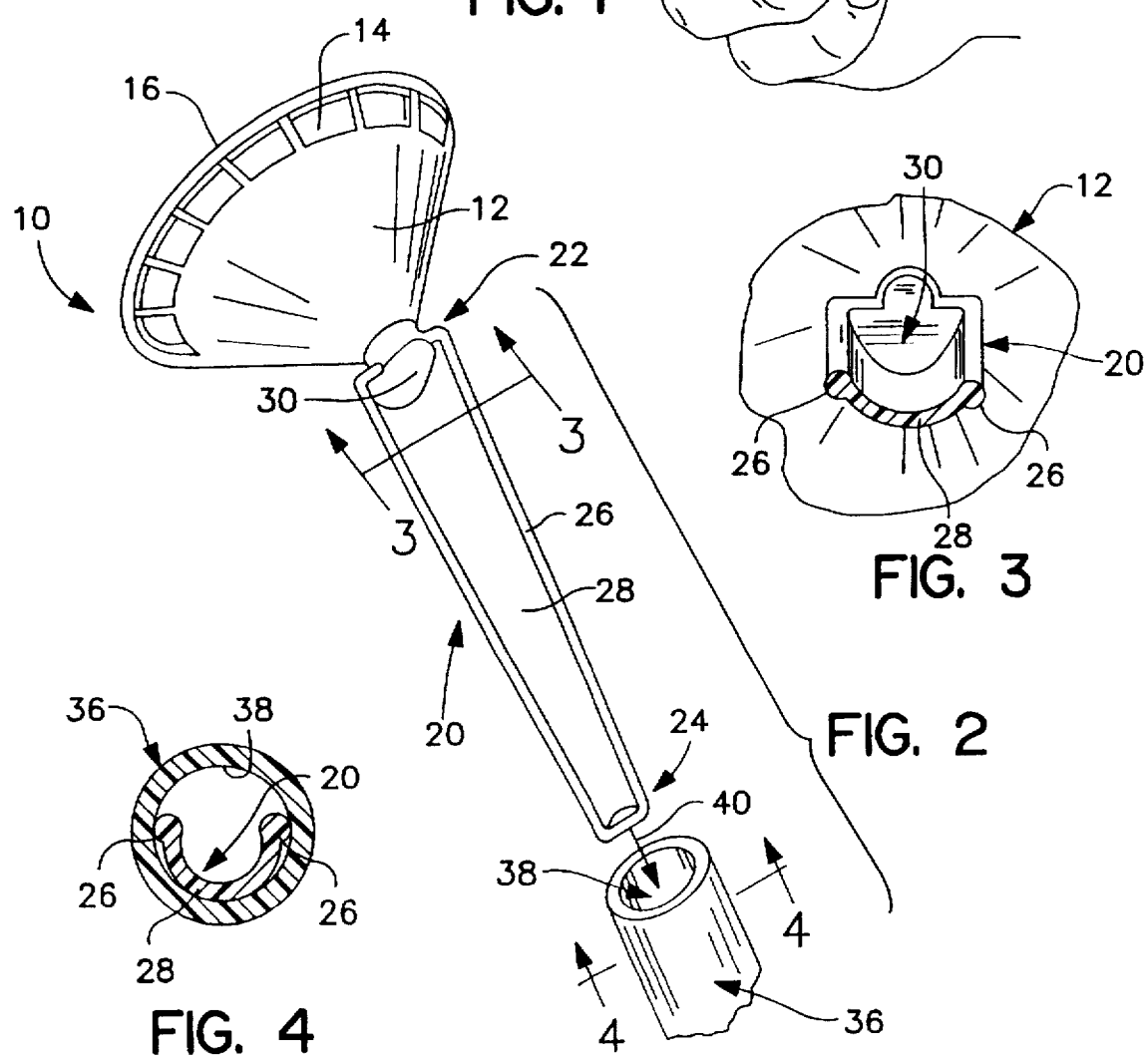

BOUQUET HOLDER APPARATUS

This is a Continuation of application Ser. No. 08/677,064, filed Jul. 8, 1996.

BACKGROUND AND SUMMARY OF THE INVENTION

The present invention relates to a bouquet holder apparatus. More particularly, the present invention relates to an improved bouquet holder apparatus having an ergonomic handle for improved support of a floral arrangement and to an improved display stand for holding the bouquet holder.

Floral bouquet holders which have a block of foam material attached to one end are well known. The foam material may be water retentive form, dri-foam, or styrofoam. See, for example, U.S. Pat. Nos. 4,566,221; 5,070,664; 5,414,957; and 5,454,189. Such bouquet holders typically include a head for holding the block of water retaining foam material and an elongated plastic handle.

One known design for bouquet holders includes a flat plastic handle extending away from the head. These conventional flat handles tend to bend under the weight of floral arrangements. Some flat plastic handles bend under weights as light as one pound.

Other known bouquet holders include a round handle. However, these round handles tend to rotate in a user's hand.

The bouquet holder of the present invention includes an improved handle design which improves the strength of the handle as well as providing ergonomic comfort to the user. The handle of the bouquet holder of the present invention is contoured or curved in a convex shape to provide an improved fit to the user's hand.

The handle of the present invention also prevents the bouquet holder from rotating in the user's hand. The user may place her thumb in the back of the contour for extra support, if desired. The handle of the present invention also adds strength to the entire bouquet holder of the present invention. The curved body portion of the handle prevents the handle from bending under the normal weight of flowers and water installed on the head.

The present invention also includes an improved stand for designing a bouquet on the bouquet holder, delivering and/or displaying the bouquet holder. The display stand permits the bouquet holder to be designed or displayed in either a vertical orientation or horizontal orientation, depending the particular application.

According to one aspect of the present invention, a bouquet holder apparatus includes a head configured to support flowers thereon and a handle extending downwardly from the head. The handle is formed to include an outer flange and a convex body portion which is curved to extend downwardly beyond a plane of the flange to facilitate gripping of the handle by a user.

The handle includes a proximal end coupled to the head and a distal end. The handle is tapered inwardly in a direction extending toward the distal end.

The handle also includes a thumb-engaging surface located near the proximal end of the handle. The thumb-engaging surface is aligned at an angle relative to the body portion. The head includes an outer flange situated within a plane. Illustratively, the thumb-engaging surface of the handle is aligned substantially parallel to the plane of the outer flange of the head.

According to another aspect of the present invention, a stand apparatus is provided for designing and/or supporting a bouquet holder which includes a head for holding flowers and a handle extending away from the head. The stand includes a base and a head portion located above the base. The head portion includes a front wall and a rear wall. The front and rear walls of the head portion each are formed to include a slot therein for receiving the handle of the bouquet holder so that the handle extends between the front and rear walls of the head portion to support the bouquet holder in a horizontal orientation.

The stand apparatus further includes a top surface extending transverse to the front and rear walls of the head portion. The top surface is formed to include a slot therein for receiving the handle of the bouquet holder to support the bouquet holder in a vertical orientation.

In the illustrated embodiment, the slots in the front and rear walls of the head portion are T-shaped to retain the bouquet holder within the head portion. The slot in the top surface is also T-shaped to retain the bouquet holder vertically within the head portion.

The base has an inclined pyramid shape including a front wall and a rear wall. The rear wall of the base is aligned at a greater angle relative to the ground than the front wall of the base. The front wall of the base is located in a plane which is aligned at an angle relative to a plane of the front wall of the head portion.

Illustratively, the rear wall of the base is formed to include an aperture to define a handle for carrying the display stand. The illustrated display stand is made from a corrugated paper material for simplifying manufacture, transport, and assembly of the stand.

According to a further aspect of the present invention, a bouquet design and display system includes a bouquet holder apparatus including a head configured to support flowers thereon and a handle extending downwardly from the head. The handle is formed to include an outer flange and a convex body portion which is curved to extend downwardly beyond a plane of the flange to facilitate gripping of the handle by a user. The bouquet design and display system also includes a stand for supporting the bouquet holder. The stand includes a base and a head portion located above the base. The head portion includes a front wall and a rear wall. The front and rear walls of the head portion each are formed to include a slot therein for receiving the handle of the bouquet holder so that the handle extends between the front and rear walls of the head portion to support the bouquet holder in a horizontal orientation. The stand further includes a top surface extending transverse to the front and rear walls of the head portion. The top surface is formed to include a slot therein for receiving the handle of the bouquet holder to support the bouquet holder in a vertical orientation.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which:

FIG. 1 is a side elevational view of the bouquet holder apparatus of the present invention being held by a user;

FIG. 2 is a perspective view of the bouquet holder apparatus of FIG. 1 and of one embodiment of a design or display stand;

FIG. 3 is a sectional view taken along lines 3—3 of FIG. 2;

FIG. 4 is a sectional view taken along lines 4—4 of FIG. 2 after the bouquet holder's handle is installed into the stand;

DETAILED DESCRIPTION OF THE DRAWINGS

Figure 5:
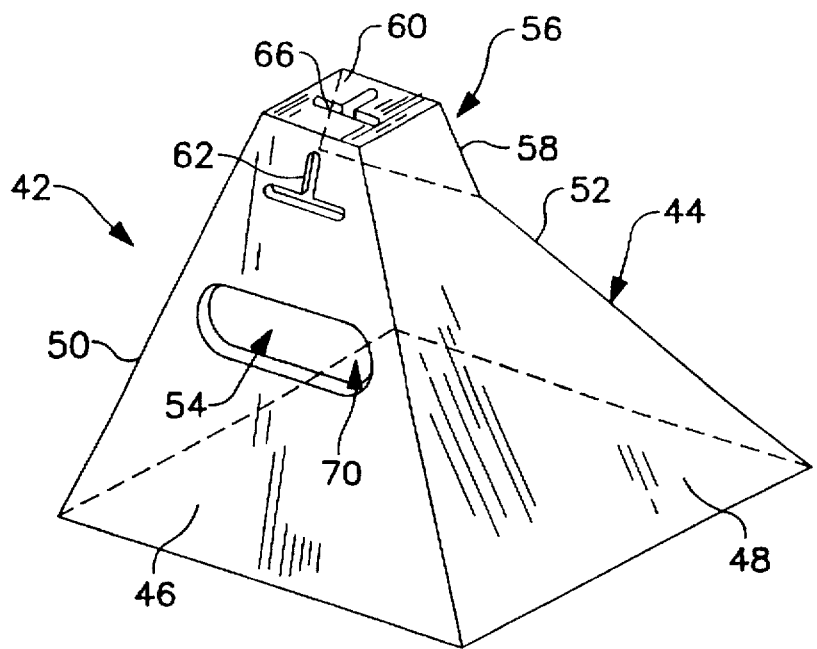
FIG. 5 is a rear perspective view of a design or display stand of the present invention.

Referring now to the drawings, FIGS. 1 and 2 illustrate the bouquet holder apparatus 10 of the present invention. The apparatus 10 includes a conically shaped head 12 formed to include a plurality of apertures 14 near a top edge 16. A block of water retaining foam, dri-foam, or styrofoam 18 for receiving fresh cut, dry or silk flowers (not shown) is coupled to head 12 in a conventional manner. An improved handle 20 extends away from the head 12 at a predetermined angle. Handle 20 includes a proximal end 22 coupled to head 12 and a distal end 24. Handle 20 includes an outer flange 26 which is slightly curved upwardly in a direction toward distal end 24.

Handle 20 further includes a generally convex body portion 28. A flat surface 30 near proximal end 22 extends in a plane generally parallel to a plane of top surface 16 of head 12. Surface 30 provides a thumb-engaging surface for the user. The body portion 28 of handle 20 extends downwardly below a plane of outer flange 26 of handle 20 to provide a contoured, ergonomic handle design which is easy to grip by a user.

As illustrated in FIG. 1, a user's hand 32 can grip handle 20 easily. The user's thumb 34 may extend into an upper thumb-receiving portion of handle 20 located near proximal end 22. Thumb 34 abuts the surface 30 to improve the user's grip and to prevent rotation of the bouquet holder 10 within the user's hand 32.

The curved design of the handle provides a stronger design than a conventional flat plastic handle. The handle 20 will not bend under a weight which exceeds the weight of normal floral arrangements.

Since the handle 20 is tapered inwardly in a direction toward distal end 24, bouquet holder 10 is easily inserted into a tube-shaped stand 36. It is understood that stand 36 may have a square shape, a triangular shape, or any other geometrical shape. Specifically, handle 20 of bouquet holder 10 can be installed into a top aperture 38 of stand 36 in the direction of arrow 40. Installation continues until the flange 26 engages the side wall of stand 36 defining aperture 38. The tapered handle 20 can accommodate and fit snugly in stands having varying sizes. In addition, the handle 20 provides improved three-point contact within the stand 36 as illustrated in FIG. 4. This improves stability of the display. In contrast, a flat handle design would only contact the tube at two locations and requires a special square insert.

An improved design/display stand 42 of the present invention is illustrated in FIG. 5. Stand 42 includes an oblique or inclined pyramid base section 44 having a rear side wall 46, a right side wall 48, a left side wall 50 and a front side wall 52. Front side wall 52 is angled or inclined at a smaller angle than rear side wall 46 relative to the ground to stabilize the base 44 when the bouquet holder 10 is inserted into the stand 42. Rear sidewall 46 is formed to include an aperture 54 which provides a handle to facilitate movement of the stand 42.

Stand 42 further includes a head portion 56 on top of base 44. Head portion 56 is defined by a front head surface 58 which is aligned at an angle relative to front wall 52 of base 44. Head portion 56 also includes a top surface 60.

Figure 6:
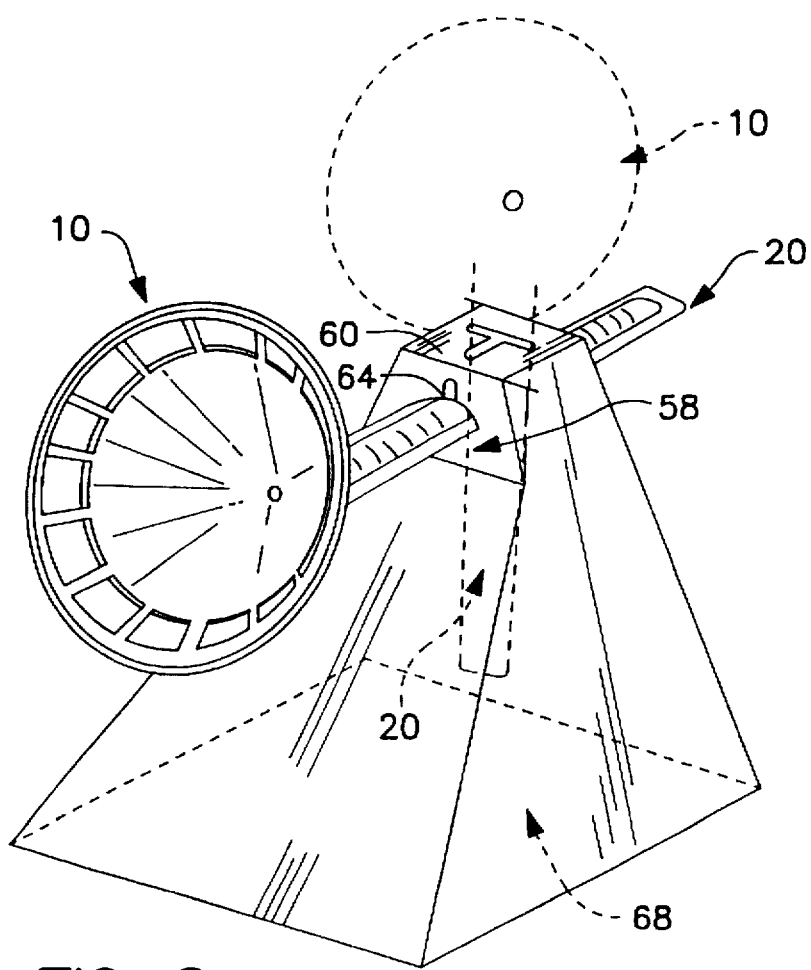
FIG. 6 is a front perspective view of the stand of FIG. 5 illustrating the bouquet holder installed into the stand.

A top portion of rear side wall 46 provides a rear surface of head portion 56 and is formed to include a T-shaped slot 62. Front surface 58 is also formed to include a T-shaped slot 64. FIG. 6 illustrates the bouquet holder 10 installed in a horizontal orientation in the stand 42. In the horizontal orientation, the handle 20 of bouquet holder 10 is inserted through the T-shaped slots 62 and 64 formed in rear side wall 46 and front surface 58, respectively. Therefore, the handle 20 extends between front and rear walls 58 and 46 of head portion 56 to support the bouquet holder 10 in the horizontal orientation. Preferably, the handle 20 is installed with the convex body portion 28 facing upwardly so that the flaps which defined the T-shaped slots 62 and 64 provide a force on the handle 20 to retain the bouquet holder 10 in the stand 42.

The bouquet holder 10 may also be installed into stand 42 in a vertical orientation. In this embodiment, the handle 20 of bouquet holder 10 is inserted to a T-shaped slot 66 formed in top surface 60 of head portion 56. Handle 20 then extends into an interior region 68 of stand 42.

The stand 42 may include a bottom surface 70. If desired, sand or another weighting material may be inserted into interior region 68 to help hold the stand 42 in place. In another embodiment, the bottom surface 70 may be omitted from the stand 42.

Although the invention has been described in detail with reference to a certain preferred embodiment, variations and modifications exist within the scope and spirit of the present invention as described and defined in the following claims.

What is claimed is:

1. A bouquet holder apparatus comprising a head configured to support flowers thereon and a handle extending downwardly from the head, the handle being formed to include an outer flange and a convex body portion which is curved to extend downwardly beyond a plane of the flange to facilitate gripping of the handle by a user, the handle including a proximal end coupled to the head, a distal end spaced apart from the proximal end, and a thumb-engaging surface located near the proximal end of the handle, the thumb-engaging surface being aligned at an angle relative to the body portion, the head including an outer flange situated within a plane, the thumb-engaging surface of the handle being aligned substantially parallel to the plane of the outer flange of the head.

2. The apparatus of claim 1 wherein the thumb engaging surface is formed as an end wall of a cavity formed in the handle.

3. The apparatus of claim 1, wherein the handle includes a proximal end coupled to the head and a distal end, the handle being tapered inwardly in a direction extending toward the distal end.

4. A bouquet holder apparatus configured to be inserted into a cylindrically shaped display tube, the apparatus comprising a head configured to support flowers thereon and a handle extending downwardly from the head, the handle being formed to include an outer flange and a convex body portion which is curved to extend downwardly beyond a plane of the flange to facilitate gripping of the handle by a user, the handle being configured to provide three-point contact upon insertion of the handle into the display tube.

5. The apparatus of claim 4, wherein the handle includes a proximal end coupled to the head and a distal end, the handle being tapered inwardly in a direction extending toward the distal end.

6. The apparatus of claim 4, wherein the handle includes a proximal end coupled to the head, a distal end spaced apart from the proximal end, and a thumb-engaging surface located near the proximal end of the handle, the thumb-engaging surface being aligned at an angle relative to the body portion.

7. The apparatus of claim 6, wherein the head includes an outer flange situated within a plane, the thumb-engaging surface of the handle being aligned substantially parallel to the plane of the outer flange of the head.

8. A bouquet holder apparatus comprising a head configured to support flowers and a handle extending downwardly from the head, the handle including a proximal end coupled to the head and a distal end spaced apart from the proximal end, the handle being formed to include a thumb receiving cavity near the proximal end of the handle which is configured with a varying depth along a length of the handle to receive a thumb of a user.

9. The apparatus of claim 8, wherein the handle is tapered inwardly in a direction extending toward the distal end.

10. The apparatus of claim 8 wherein the cavity is tapered from a wide area adjacent the proximal end to a narrower area closer to the distal end than the wide area.

11. The apparatus of claim 8 wherein the cavity is tapered inwardly from a wide portion on an external surface of the handle to a narrower portion within the handle.

12. The apparatus of claim 10 wherein the cavity is tapered inwardly from a wide portion on an external surface of the handle to a narrower portion within the handle.

13. The apparatus of claim 8, wherein the head includes an outer flange situated within a plane, the cavity being formed partially by a surface aligned generally parallel to the plane of the outer flange of the head.

14. The apparatus of claim 8, wherein the handle is formed to include a concave portion extending from the thumb receiving cavity toward the distal end of the handle.

15. The apparatus of claim 13 wherein the concave portion is tapered from a wide area adjacent the cavity to a narrower area closer to the distal end than the wide area.

16. The apparatus of claim 13 wherein the concave portion is tapered inwardly from a wide portion on an external surface of the handle to a narrower portion within the handle.

17. The apparatus of claim 15 wherein the concave portion is tapered inwardly from a wide portion on an external surface of the handle to a narrower portion within the handle.

18. The apparatus of claim 8, wherein the thumb receiving cavity is formed in a top surface of the handle, a bottom surface of the handle having a convex shaped portion.

\* \* \* \* \*